United States Patent
Reuter

[11] Patent Number: 6,164,460
[45] Date of Patent: Dec. 26, 2000

[54] RACK FOR A SWITCHGEAR CABINET

[75] Inventor: Wolfgang Reuter, Burbach, Germany

[73] Assignee: Rittal-Werk Rudolf Loh GmbH & Co. KG, Herborn, Germany

[21] Appl. No.: 09/275,211

[22] Filed: Mar. 24, 1999

[30] Foreign Application Priority Data

Mar. 26, 1998 [DE] Germany .......................... 198 13 222

[51] Int. Cl.[7] ................................. A47F 7/00; H02B 1/01
[52] U.S. Cl. ........................ 211/26; 211/189; 312/265.1; 361/825
[58] Field of Search .................. 211/26, 189; 52/282.3, 52/293.3, 637; 403/295, 403; 361/724, 825; 312/265.1–265.4, 351.1, 276, 285; 248/500, 501

[56] References Cited

U.S. PATENT DOCUMENTS

| | | | |
|---|---|---|---|
| 2,785,035 | 3/1957 | Hammer | 312/265.1 |
| 3,265,419 | 8/1966 | Durnbaugh et al. | 312/265.1 |
| 3,563,627 | 2/1971 | Whipps | 312/265.2 |
| 3,919,603 | 11/1975 | Salvati et al. | 211/182 |
| 4,643,319 | 2/1987 | Debus et al. | 211/182 |
| 4,725,083 | 2/1988 | Schauer | 403/295 |
| 4,900,108 | 2/1990 | Tischer | 312/265.3 |
| 5,202,818 | 4/1993 | Betsch et al. | 211/189 |
| 5,226,706 | 7/1993 | Tuller | 312/276 X |
| 5,228,762 | 7/1993 | Mascrier | 312/265.4 |
| 5,275,296 | 1/1994 | Zachrai | 211/26 |
| 5,284,254 | 2/1994 | Rinderer | 211/26 |
| 5,326,162 | 7/1994 | Bovermann | 312/265.1 |
| 5,333,950 | 8/1994 | Zachrai | 312/265.1 |
| 5,388,903 | 2/1995 | Jones et al. | 312/265.3 |
| 5,392,932 | 2/1995 | Vongfuangfoo | 211/26 |
| 5,584,406 | 12/1996 | Besserer et al. | 211/26 |
| 5,636,936 | 6/1997 | Kremser | 403/295 |
| 5,664,757 | 9/1997 | Simonis | 211/26 |
| 5,695,263 | 12/1997 | Simon et al. | 312/265.4 |
| 5,761,797 | 6/1998 | Besserer et al. | 361/825 |
| 5,806,946 | 9/1998 | Benner et al. | 312/265.4 |

FOREIGN PATENT DOCUMENTS

| | | | |
|---|---|---|---|
| 620483 | 8/1962 | Belgium | 312/265.4 |
| 33 44 598 C1 | 9/1984 | Germany . | |

Primary Examiner—Daniel P. Stodola
Assistant Examiner—Jennifer E. Novosad
Attorney, Agent, or Firm—Pauley Petersen Kinne & Fejer

[57] ABSTRACT

A rack for a switchgear cabinet, whereby the rack is assembled from frame legs, four of the frame legs being horizontally oriented forming a lower rack frame, which is connected to support profiles for bottom plates. The support profiles form a bottom frame (30), which has upward projecting fastening straps (50, 52). The frame legs (12 to 14) of the lower rack frame (11) have vertically aligned inner profile sides (21), which are provided with recesses (26) in the area of their lower edges (23) and of the adjoining profile sides for introducing the fastening straps (50, 52), and the fastening straps (50, 52) are screwed in place, resting on the inside of these inner profile sides (21) of the lower rack frame (11).

18 Claims, 3 Drawing Sheets

RACK FOR A SWITCHGEAR CABINET

BACKGROUND OF THE INVENTION

1. Field of the Invention

The invention relates to a rack for a switchgear cabinet, which is assembled from a plurality of frame legs, four frame legs of which are horizontally oriented forming a lower rack frame, which is connected with support profiles for bottom plates.

2. Description of Prior Art

A rack of this type is taught by German Patent Publication DE 33 44 598 C1. Here, separate support profiles are screwed to the lower rack frame, to which bottom plates, which are resting on them, can be fastened and which close the open underside of the rack. These support profiles extend over at least two oppositely located frame legs of the lower rack frame and are fastened thereon, as a result of which they obstruct the fastening to these frame legs from one direction. In the two fastening profile sides which are located at right angles to each other and which form an inner edge of the rack, the frame legs have rows of system fastening receivers which, after attachment of the support profiles, are partially covered and therefore no longer accessible.

SUMMARY OF THE INVENTION

It is one object of this invention to provide a means for attaching the support profiles for the bottom plates of a rack of the type mentioned at the outset in such a way that the attachment possibilities on the frame legs of the lower rack frame are not obstructed.

In accordance with one embodiment of this invention, this and other objects are attained whereby the support profiles form a bottom frame, which has upwardly projecting fastening straps, the frame legs of the lower rack frame have vertically aligned inner profile sides, which are provided with recesses in the area of their lower edges and of the adjoining profile sides for introducing the fastening straps, and the fastening straps are screwed in place, resting on the inside of these inner profile sides of the lower rack frame.

The prefabricated bottom frame can be attached in a simple manner to the rack wherein, in connection with a switchgear cabinet having a switchgear cabinet base, it is disposed between the switchgear cabinet base and the lower rack frame of the rack. In this case, the two profile sides of the frame legs, which have been provided with rows of system fastening receivers and form an inner edge of the rack, remain completely accessible and usable for the attachment of additional elements.

For the connection between the bottom frame and the rack frame in accordance with one embodiment of this invention, the fastening straps form threaded bores, and the inner profile sides of the frame legs of the lower rack frame form fastening receivers, which are aligned with the threaded bores, for fastening screws.

A definite fastening of the bottom frame on the rack is achieved wherein two fastening straps are provided in each corner area of the bottom frame and are connected to the horizontal bottom legs of the lower rack frame. The horizontal bottom legs meet each other at right angles in the corner area and the two fastening straps are oriented at right angles with respect to each other and are aligned with the inner profile sides of the facing frame legs.

In accordance with one embodiment of this invention, the transition between the rack and the bottom frame is designed in such a way that the bottom frame has a circumferential, upward projecting outer edge and a circumferential, L-shaped support edge, which is facing in the direction of the outer edge, and the bottom frame forms a receptacle for the lower rack frame of the rack between the outer wall and the support edge.

In accordance with a particularly preferred embodiment, the bottom frame is assembled from four support profile sections and four corner pieces, wherein the corner pieces cover the abutting support profile sections with the attachment plates supporting the fastening straps.

The support profile sections are cut to length and are assembled with uniform corner pieces to form the bottom frame of the desired size. In accordance with this embodiment, the attachment plates are raised in the direction toward the lower rack frame by the amount of the wall thickness of the support profile sections with respect to the base of the corner pieces, and extend from the fastening straps only in the direction toward the support edge of the bottom frame in order to displace the fastening straps into the area of the ends of the horizontally arriving frame legs.

So that the lower rack frame of the rack is seated flush in the bottom frame, in accordance with a further embodiment, the edge pieces with the outer corner pieces complement the outer edge of the bottom frame, and the support profile sections and the corner pieces form a support surface of uniform height for the lower rack frame of the rack between the outer edge and the fastening straps, which are angled off from the attachment plates.

In accordance with one embodiment, the fastening straps are offset at the attachment plates of the corner pieces at least by the amount of the wall thickness of the inner profile sides of the lower horizontal frame legs in the direction toward the outer edge of the bottom frame, so that the attachment plates only extend in the area of the fastening straps into the area of the frame legs, so that they can be inserted into the recesses of the latter.

So that the attachment plates can be slightly offset toward the top in relation to the base of the corner pieces, it is provided that with a raised partial area the attachment plates extend into the base of the corner pieces and are turned upward in this partial area.

For fastening the bottom frame on the switchgear cabinet base, in accordance with one embodiment, the base and the upturned partial area of the corner pieces are respectively provided with fastening bores.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
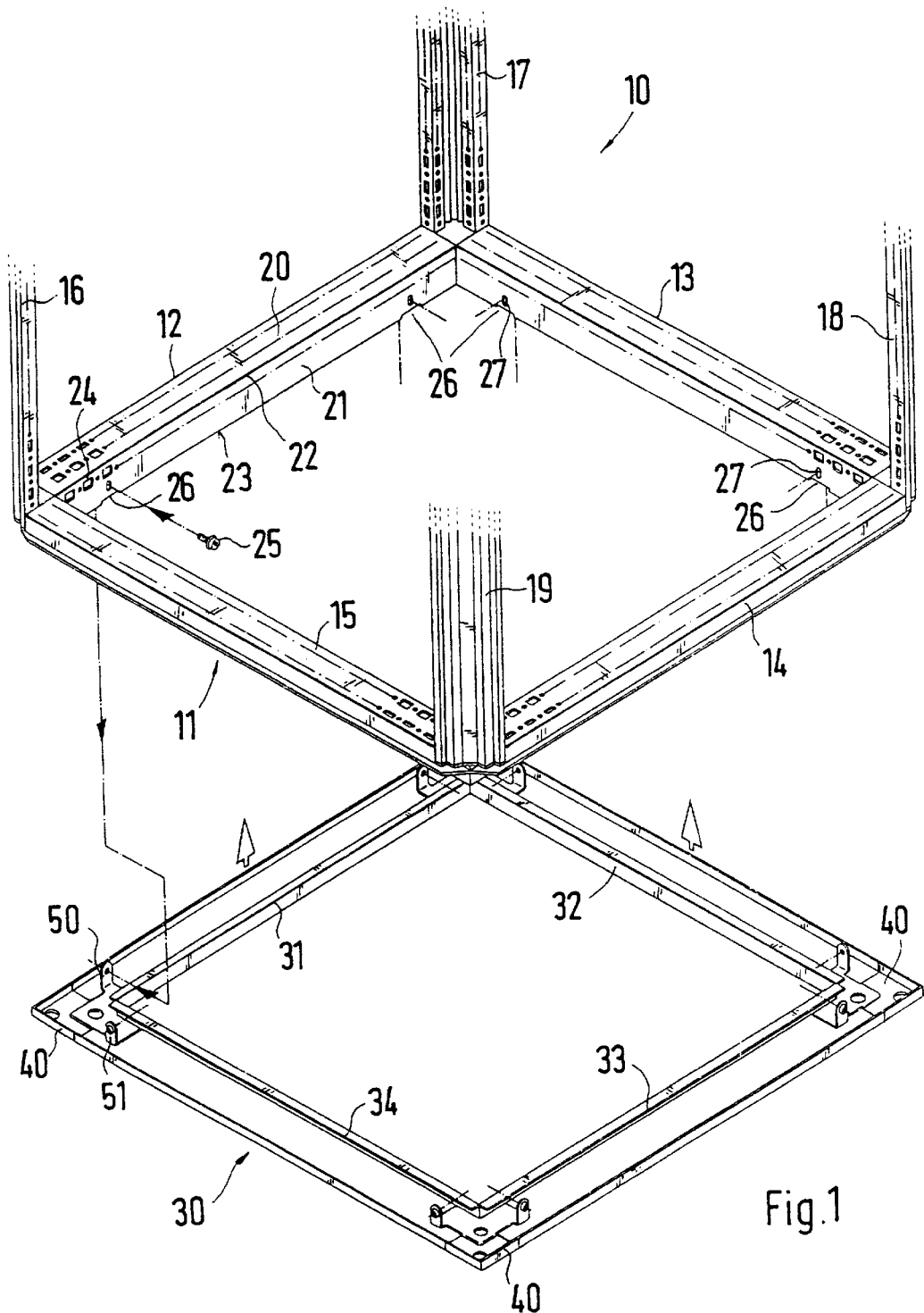
FIG. 1 is a perspective exploded view of a bottom frame for the support and fastening of bottom plates, which can be connected to the lower rack frame of a rack in accordance with one embodiment of this invention.

Only the lower part with the lower rack frame 11, which is formed from horizontally oriented frame legs 12, 13, 14 and 15, of the rack 10 of a switchgear cabinet, is shown in FIG. 1. The vertical frame legs 16, 17, 18 and 19 are attached to the corner areas of the rack frame 11, the upper ends of which are connected with an upper rack frame (not shown).

A bottom frame 30 comprises four support profile sections 31 to 34 and four corner pieces 40 and is fastened to the lower rack frame 11 of the rack 10, and in the process comes to lie between the switchgear cabinet base (not shown) and the rack 10.

Figure 2:
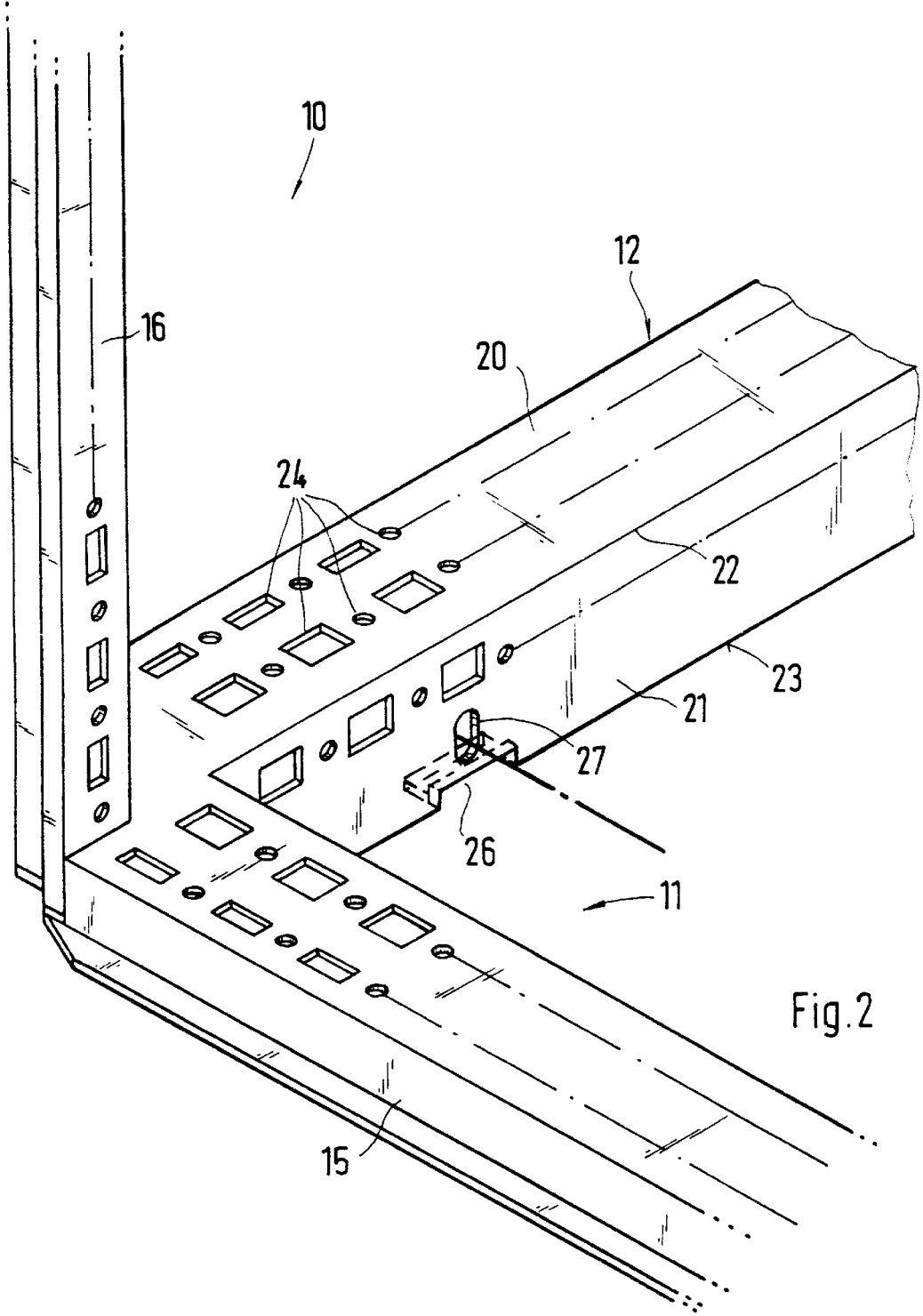
FIG. 2 is an enlarged perspective partial view of a corner area of the rack in accordance with one embodiment of this invention.

As FIGS. 1 and 2 show, the profile sides 20 and 21 of the frame legs 12 to 15, which are at right angles in relation to each other, form an inner edge 22 of the rack 10 and form rows of system fastening receivers 24. In the area of their lower edge 23 and of the adjoining profile side (not identified in detail), the vertically aligned insides 21 form a recess 26, the width of which is matched to the width of fastening straps 50 and 52, which project upward from the bottom frame 30 and are arranged in the same distribution as the recesses 26. In the process, the fastening straps 50 and 52 come to rest against the inside of the vertical inner profile side 21, and can be screwed together with them. To this end, threaded bores 51 and 53 have been cut into the fastening straps 50 and 52, which are placed congruently with fastening receivers 27 in the inner profiles 21 and can receive the fastening screws 25 in such a way that the latter can be screwed into the threaded bores 51 and 53. In this case, the rows of system fastening receivers 24 of the profile sides 20 and 21 of the frame legs 12 to 15 remain freely accessible and can be unobstructedly used for the attachment of additional elements.

Figure 3:
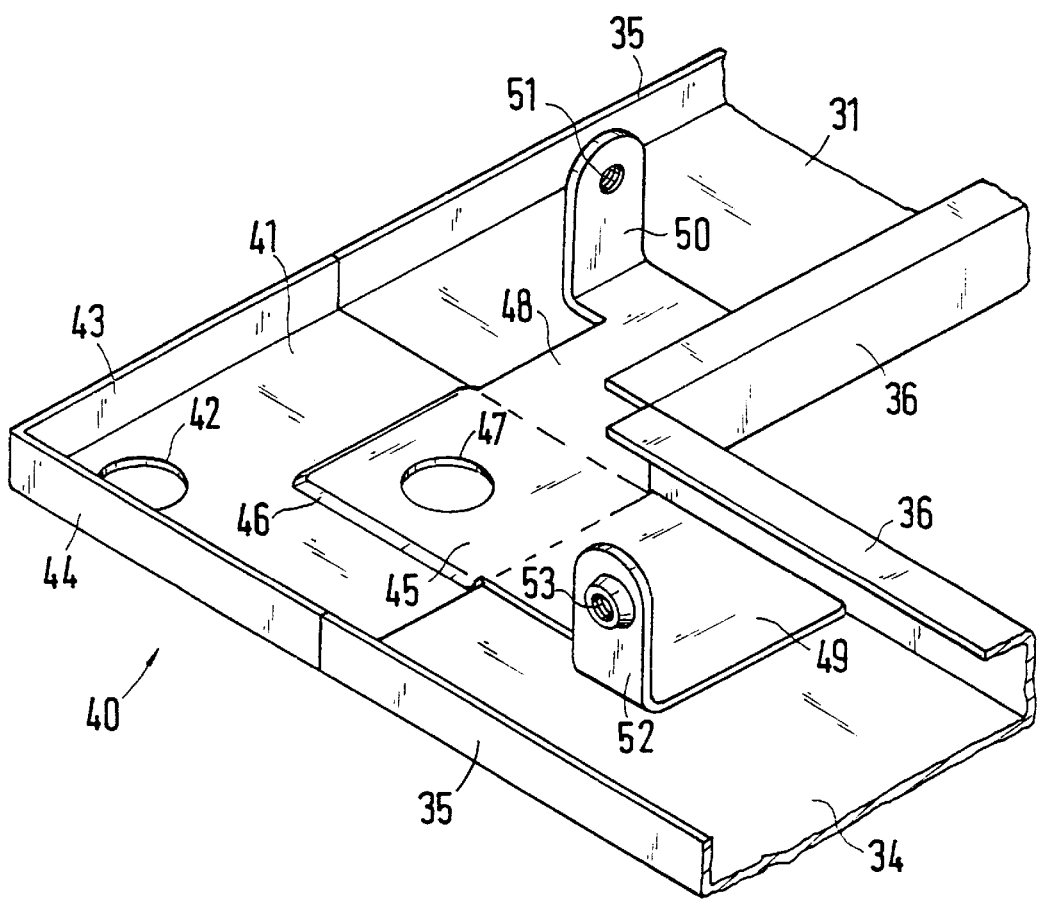
FIG. 3 is an enlarged perspective partial view of the corner area of the bottom frame in accordance with one embodiment of this invention.

As FIG. 3 shows, the corner pieces 40, as well as the support profile sections 31 to 34, are provided with beveled outer edge pieces 43, 44 and 35, so that the outer edge 35 of the support profile sections 31 to 34 is contiguous and extends over the entire circumference of the bottom frame 30. The base 41 of the corner piece 40 is connected with the abutting support profile sections, for example 31 and 34. The L-shaped support edges 36 of the support profile sections 31 to 34 directly abut against each other and form an inwardly offset support frame for bottom plates, which protrudes in the direction toward the interior of the rack 10 at the lower rack frame 11. The corner pieces 40 cover the ends of the abutting support profile sections, for example 31 and 34, with attachment plates 48 and 49. However, the attachment plates 48 and 49 are upwardly offset by the amount of the wall thickness of the support profile sections 31 to 34, so that they rest on the base and can be connected with it. These attachment plates support the fastening straps 50 and 52 for the frame legs 12 and 15 and extend from the fastening straps 50 and 52 only in the direction toward the support edge 36 of the facing support profile sections 31 and 34.

Here, the fastening straps 50 and 52 on the facing edge of the attachment plates 48 and 49 project away by at least the amount of the wall thickness of the profile side 21 of the frame legs 12 to 15, so that the attachment plates 48 and 49 do not extend up to the profile side 21. The attachment plates 48 and 49 extend in a partial section 45 onto the base 41 of the corner piece 40 and are upwardly offset with this partial section 45, as revealed by the bevel 46. In this way a circumferential support level is formed for the lower rack frame 11 of the rack 10 between the outer edge 35 of the outer profile section 31 to 34, and the outer edge pieces 43 and 44 of the corner pieces 40 as far as the facing outsides of the fastening straps 50 and 52, so that the frame 11 is placed flush into the bottom frame 30. The base 41 and the raised partial area 45 of the corner pieces 40 are provided with fastening bores 42 and 47, which can be used for connecting the bottom frame 30 with the switchgear cabinet base.

The corner pieces 40 can be cost-effectively manufactured as stamped and bent elements in one piece and can be welded to the support profile section 31 to 34.

What is claimed is:

1. A rack for a switchgear cabinet which is assembled from a plurality of frame legs, four of said frame legs being horizontally oriented, forming a lower rack frame, and said lower rack frame connected to support profile sections adapted to support a bottom plate of said cabinet, the improvement comprising:
a bottom frame (30) comprising four corner pieces (40) and said support profile sections (31; 32; 33; 34) and having a plurality of upwardly projecting fastening straps (50, 52);
each of said horizontal frame legs (12 to 15) of the lower rack frame (11) comprising a vertically aligned inner profile side (21), and each of said vertically aligned inner profile sides (21) forming a plurality of recesses (26) along a lower edge (23) proximate an adjoining said profile side which receive the fastening straps (50, 52);
the fastening straps (50, 52) being screwed in place, disposed on a side of said vertically aligned inner profile sides (21) of the lower rack frame (11) facing away from an interior of said cabinet; and
two attachment plates (48,49) having a raised partial area (45) with an upwardly offset bezel (46) which extends onto a base (47) of each of said four corner pieces (40).

2. A rack in accordance with claim 1, wherein
each of said fastening straps (50, 52) forms a threaded bore (51, 53), and each of the vertically aligned inner profile sides (21) of the frame legs (12, 13, 14, 15) of the lower rack frame (11) comprises a fastening receiver (27) aligned with said threaded bore for fastening a screw (25) thereto.

3. A rack in accordance with claim 2, wherein
two of said fastening straps (50, 52) are disposed in each corner area of the bottom frame (30) and connected to said horizontal frame legs (12, 13; 13, 14; 14, 15, 15, 12) of the lower rack frame (11), said horizontal frame legs meeting each other at right angles in the corner areas, wherein the two fastening straps (50, 52) are oriented at right angles with respect to each other and are aligned with the vertically aligned inner profile sides (21) of a facing said horizontal frame leg (12, 13, or respectively, 13, 14, or respectively 14, 15, or respectively 15, 12).

4. A rack in accordance with claim 3, wherein
the bottom frame (30) comprises a circumferential, upwardly projecting outer edge (35, 43, 44) and a circumferential, L-shaped support edge (36), which is facing in a direction of the outer edge (35, 43, 44), and
the bottom frame (30) forms a receptacle for the lower rack frame (11) of the rack (10) between the upwardly projecting outer edge (35, 43, 44) and the support edge (36).

5. A rack in accordance with claim 4, wherein
the bottom frame (30) comprises four said support profile sections (31 to 34) and four said corner pieces (40), each of the corner pieces (40) covering two adjacent support profile section ends (12, 13, or respectively, 13, 14, or respectively 14, 15, or respectively 15, 12) with two attachment plates (48,49) which comprise the fastening straps (50, 51).

6. A rack in accordance with claim 5, wherein
the attachment plates (48, 49) are raised in a first direction toward the lower rack frame (11) by an amount of a wall thickness of the support profile sections (31 to 34) with respect to a base (41) of the corner pieces (40), and extend from the fastening straps (50, 52) in a second direction toward a support edge (36) of the bottom frame (30).

7. A rack in accordance with claim 6, wherein
each said corner piece (40) comprises an upwardly projecting outer edge (43,44) which abuts said upwardly projecting outer edge (35) of the support profile sections (31 to 34).

8. A rack in accordance with claim 7, wherein
the support profile sections (31 to 34) and a plurality of said corner pieces (40) form a support surface of uniform height for the lower rack frame (11) of the rack (10) between said upwardly projecting outer edges of the support profile sections and the corner pieces (35, 43, 44) and the upwardly projecting fastening straps (50, 52), each of said upwardly projecting fastening straps (50, 52) being connected to one of said attachment plates (48, 49).

9. A rack in accordance with claim 8, wherein
each of the fastening straps (50, 52) are horizontally offset from the attachment plate (48, 49) of the corner piece (40) at least by an amount of a thickness of the vertically aligned inner profile sides (21) of the lower horizontal frame legs (12, 13, 14, 15) in a direction away from an interior of said cabinet.

10. A rack in accordance with claim 9, wherein
the base (41) and the raised partial area (45) of the corner pieces (40) each form a fastening bore (42 and 47).

11. A rack in accordance with claim 1, wherein
two of said fastening straps (50, 52) are disposed in each corner area of the bottom frame (30) and connected to mid horizontal frame legs (12, 13; 13, 14; 14, 15, 15, 12) of the lower rack frame (11), said horizontal frame legs meeting each other at right angles in the corner areas, wherein the two fastening straps (50, 52) are oriented at right angles with respect to each other and are aligned with the vertically aligned inner profile sides (21) of a facing said horizontal frame leg (12, 13, or respectively, 13, 14, or respectively 14, 15, or respectively 15, 12).

12. A rack in accordance with claim 1, wherein
the bottom frame (30) comprises a circumferential, upwardly projecting outer edge (35, 43, 44) and a circumferential, L-shaped support edge (36), which is facing in a direction of the outer edge (35, 43, 44), and
the bottom frame (30) forms a receptacle for the lower rack frame (11) of the rack (10) between the upwardly projecting outer edge (35, 43, 44) and the support edge (36).

13. A rack in accordance with claim 1, wherein
the bottom frame (30) comprises four said support profile sections (31 to 34) and four corner pieces (40), each of the corner pieces (40) covering two ends (12, 13, or respectively, 13, 14, or respectively, 14, 15, or respectively 15, 12) of adjacent said support profile sections with two attachment plates (48, 49) which comprise the fastening straps (50, 51).

14. A rack in accordance with claim 13, wherein
the attachment plates (48, 49) are raised in a first direction toward the lower rack frame (11) by an amount of a wall thickness of the support profile sections (31 to 34) with respect to a base (41) of the corner pieces (40), and extend from the fastening straps (50, 52) in a second direction toward a support edge (36) of the bottom frame (30).

15. A rack in accordance with claim 1, wherein
the bottom frame comprises four said corner pieces (40) having an upwardly projecting outer edge (43, 44) which abuts an upwardly projecting outer edge (35) of the support profile sections (31 to 34).

16. A rack in accordance with claim 1, wherein
the support profile sections (31 to 34) and a plurality of corner pieces (40) form a support surface of uniform height for the lower rack frame (11) of the rack (10) between outer edges of the support profile sections and the corner pieces (35, 43, 44) and the upwardly projecting fastening straps (50, 52), each of said upwardly projecting fastening straps (50, 52) being connected to one of the attachment plates (48, 49).

17. A rack in accordance with claim 1, wherein
each of the fastening straps (50, 52) are horizontally offset from an attachment plate (48, 49) of a corner piece (40) at least by an amount of a thickness of the vertically aligned inner profile sides (21) of the lower horizontal frame legs (12, 13, 14, 15) in a direction away from an interior of said cabinet.

18. A rack in accordance with claim 1, wherein
the base (41) and the raised partial area (45) of the corner pieces (40) each form a fastening bore (42 and 47).

* * * * *